United States Patent
Ha

(10) Patent No.: US 7,176,946 B2
(45) Date of Patent: Feb. 13, 2007

(54) DISPLAYING APPARATUS AND METHOD OF CONTROLLING THE SAME

(75) Inventor: Tae-Hyeun Ha, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 672 days.

(21) Appl. No.: 10/068,876

(22) Filed: Feb. 11, 2002

(65) Prior Publication Data

US 2002/0109669 A1 Aug. 15, 2002

(30) Foreign Application Priority Data

Feb. 13, 2001 (KR) ............................ 2001-7107
Feb. 13, 2001 (KR) ............................ 2001-7108

(51) Int. Cl.
G09G 5/00 (2006.01)
(52) U.S. Cl. .................. 345/652; 345/651; 345/660; 345/661; 345/677; 345/815
(58) Field of Classification Search ............... 345/815, 345/651, 652, 660, 661, 677
See application file for complete search history.

(56) References Cited

U.S. PATENT DOCUMENTS

| 4,782,384 A | 11/1988 | Tucker et al. .............. 358/22 |
| 6,396,487 B1 * | 5/2002 | Jameson .................... 715/788 |
| 6,556,253 B1 * | 4/2003 | Megied et al. .............. 348/565 |

FOREIGN PATENT DOCUMENTS

| JP | 59-106037 | 6/1984 |
| JP | 1-119167 | 5/1989 |
| JP | 6-178207 | 6/1994 |
| JP | 7-162750 | 6/1995 |
| JP | 9-107489 | 4/1997 |
| KR | 1996-012984 | 4/1996 |
| KR | 1998-007534 | 3/1998 |
| KR | 1998-007566 | 3/1998 |
| KR | 1998-047382 | 9/1998 |
| KR | 1999-005774 | 1/1999 |
| KR | 1999-015573 | 3/1999 |
| KR | 1999-016555 | 3/1999 |
| KR | 1999-032075 | 5/1999 |
| KR | 2000-0001310 | 1/2000 |

* cited by examiner

Primary Examiner—Kee M. Tung
Assistant Examiner—Tam Tran
(74) Attorney, Agent, or Firm—Robert E. Bushnell, Esq.

(57) ABSTRACT

A displaying apparatus including a signal generator part generating a video signal, and a display part displaying thereon a picture based on the video signal generated by the signal generator part, further comprising including a setting part including a portion set part for setting whether to indicate an arbitrary portion within a screen of the display part, and a size adjuster part adjusting the size of the set portion based on movement from an arbitrary position within the portion set by the portion set part to another position; and a controller part for storing a position value of the set portion set by the setting part, generating a setting signal corresponding to the set portion based on the position value, and processing the video signal according to the setting signal. With this configuration, the user can make a selection allowing an emphasized portion to be shown within a screen of the display part, and can select the size, the position, and the brightness of the emphasized portion.

14 Claims, 4 Drawing Sheets

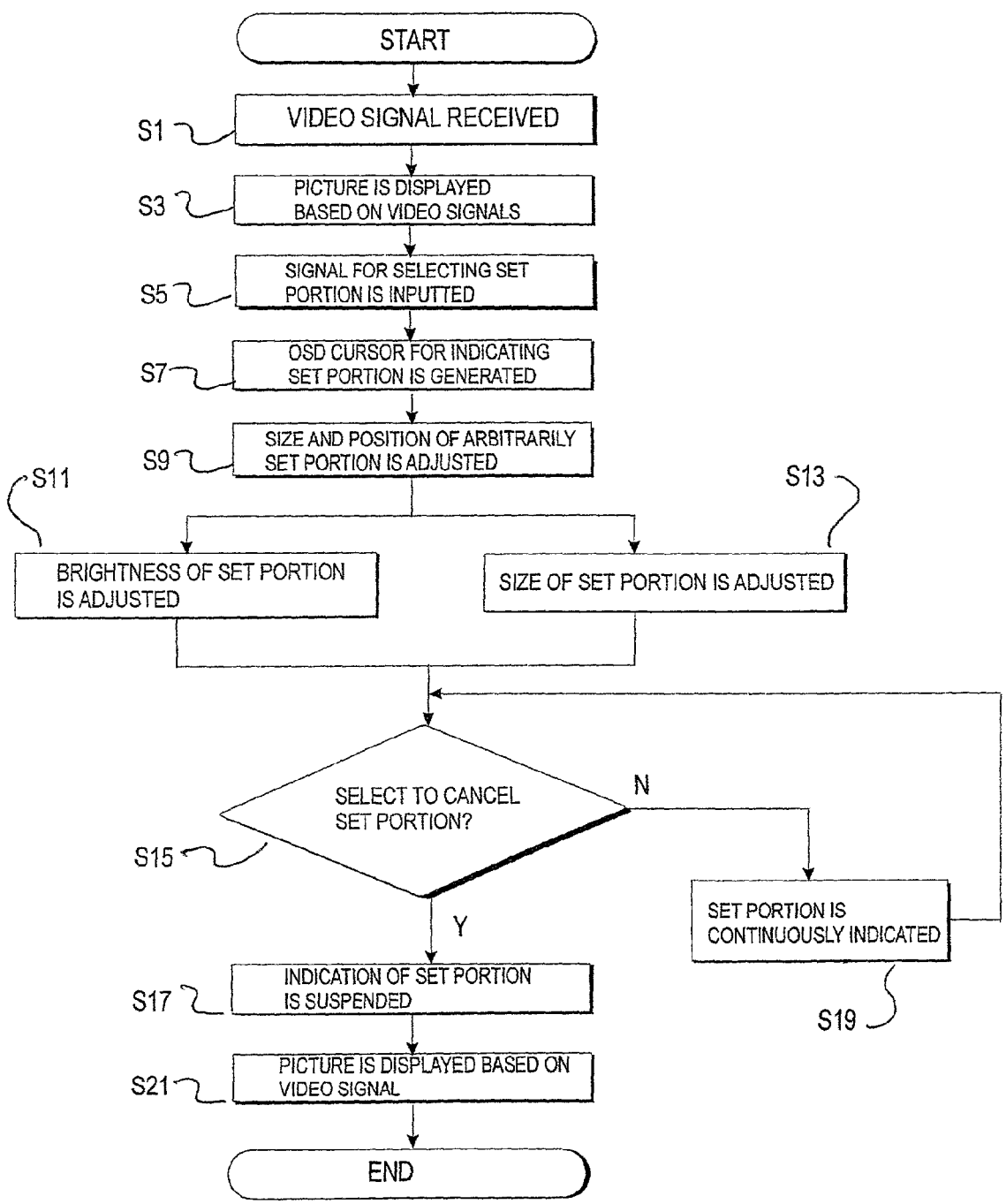

DISPLAYING APPARATUS AND METHOD OF CONTROLLING THE SAME

CLAIM OF PRIORITY

This application makes reference to, incorporates the same herein, and claims all benefits accruing under 35 U.S.C §119 from two applications entitled Display Apparatus And Control Method There of earlier filed in the Korean Industrial Property Office on 13 Feb. 2001, and there duly assigned Serial No. 01-7107 and 01-7108 by that Office.

BACKGROUND OF THE INVENTION

1. Field of the Invention

The present invention relates in general to a displaying apparatus and a method of controlling the same, and more particularly, to a displaying apparatus equipped with an on screen display (OSD) and a method of controlling the same.

2. Description of the Related Art

Recently, ordinary users enjoy viewing moving pictures and high definition of pictures by means of monitors. Going a step forward, they wish a variety of data supplied to the monitor by means of a computer system to be displayed on a screen of a television (TV) set. The users need a function of convergence that a certain data is available for being used both in the monitor and the TV set. In order to meet this need, high definition of pictures or moving picture data compatibly used in the monitor and the TV set have been produced, and these data are widely distributed to a good number of users through the Internet.

If users are in possession of these moving pictures or picture data, they want to view brighter and more vivid pictures. In this regard, they may feel more satisfaction by viewing the pictures and the moving pictures through the TV set rather than viewing them through the monitor because the TV set has better sharpness than the monitor. To act in concert with such a need by the users, there has been proposed a displaying apparatus capable of increasing the quality of pictures or moving pictures and without a decrease in the quality of texts.

However, such a conventional displaying apparatus is required to install a specific software program within the main body of the computer in order to enhance a resolution of a portion on which a picture is displayed as desired by a user, thus inconveniencing the user.

SUMMARY OF THE INVENTION

Accordingly, the present invention has been made keeping in mind the above-described shortcoming and the user's need, and an object of the present invention is to provide a displaying apparatus, without having to install a separate software program, capable of setting up a portion within a display screen and adjusting a size of the set portion in an arbitrary manner and freely adjusting a brightness of the set portion, and a method of controlling the displaying apparatus.

This and other objects of the present invention may be accomplished by the provision of a displaying apparatus comprising a signal generator part generating a video signal, and a display part displaying thereon a picture based on the video signal generated by the signal generator part, further comprising a setting part including a portion set part for setting whether to indicate an arbitrary portion within a screen of the display part, and a size adjuster part adjusting the size of the set portion based on movement from an arbitrary position within the portion set by the portion set part to another position; and a controller part for storing a position value of the set portion set by the setting part, generating a setting signal corresponding to the set portion based on the position value, and processing the video signal according to the setting signal.

Preferably, the controller part increases a signal level of the set portion by synthesizing a value of the video signal and a value of the setting signal corresponding to the set portion, or decreases a signal level of the set portion by offsetting a value of the video signal and a value of the setting signal corresponding to the set portion.

In addition, it is possible that the displaying apparatus further comprises a clock generator part generating a clock according to a reference position of the set portion based on the position value of the set portion set by the portion set part, the setting signal comprises at least one color signal corresponding to the video signal, and the setting part further comprises at least one signal adjuster part for changing the levels of the respective color signals.

Preferably, the displaying apparatus further comprises a storage part storing the position value of the set portion set through the setting part; and a scaler adjusting the width of the setting signal of the set portion set through the size adjuster part; and the controller adjusts the signal level of the set portion by processing the video signal with the setting signal, thereby enlarging or reducing a picture on the set portion.

According to another aspect of the present invention, the above and other objects maybe also achieved by the provision of a method of controlling a displaying apparatus comprising a signal generator part generating a video signal, and a display part displaying thereon a picture based on the video signal generated by the signal generator part, comprising the steps of setting an arbitrary portion within a screen of the display part; generating a setting signal corresponding to the set portion and adjusting the set portion based on movement from an arbitrary position of the set portion to another position; and processing the video signal according to the setting signal corresponding to the set portion.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 4 is a control flow chart of the displaying apparatus according to the present invention.

DETAILED DESCRIPTION OF THE PREFERRED EMBODIMENT

Figure 1:
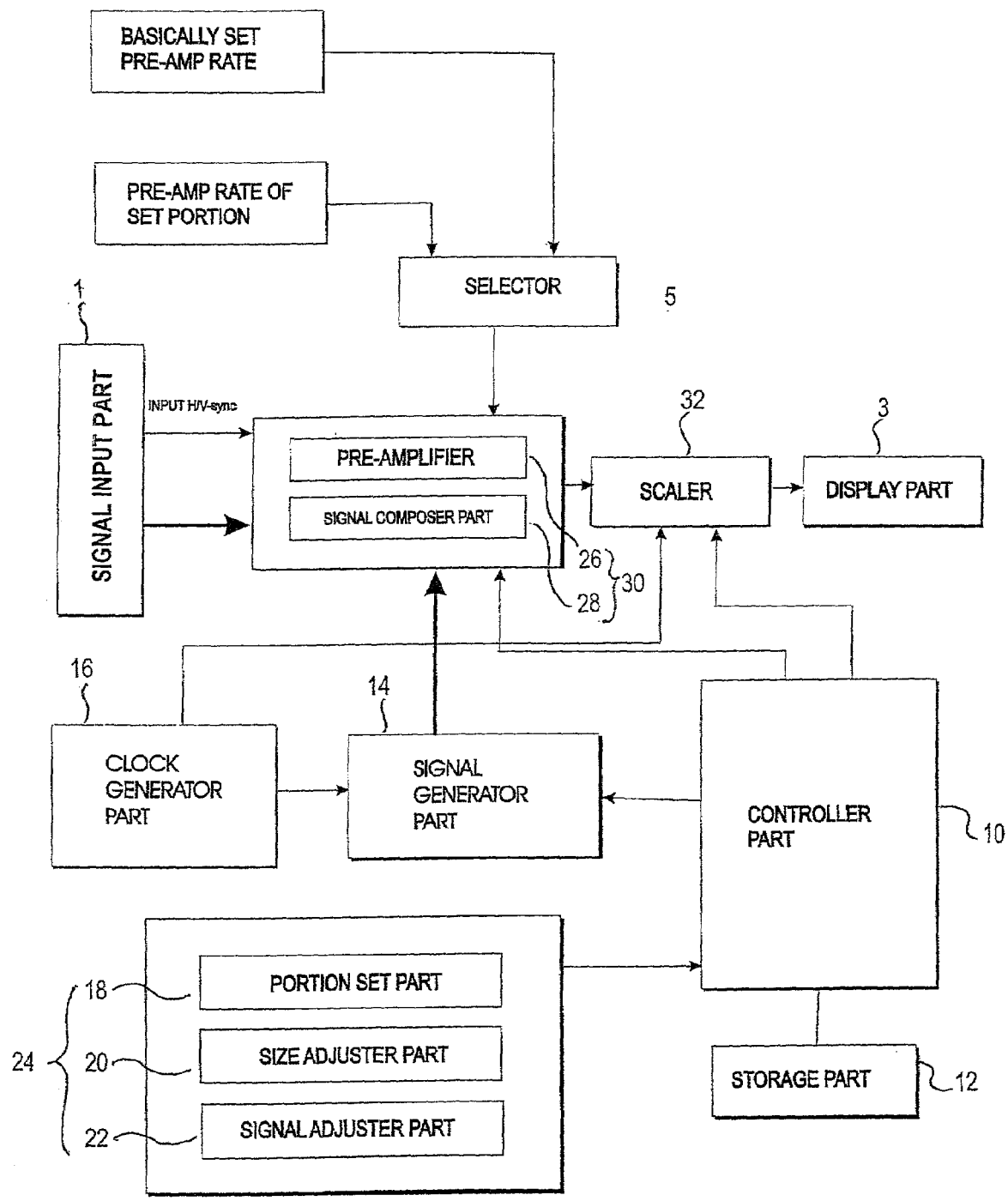
FIG. 1 is a control block diagram of a displaying apparatus according to the present invention.

Referring to FIG. 1 which is a control block diagram of a displaying apparatus according to the present invention, the displaying apparatus according to the present invention is comprised of a signal input part 1 for receiving a video signal input from a host computer (not shown), and a display part 3 for displaying thereon a picture based on R, G and B signals input through the signal input part 1. The displaying apparatus is provided therein with a setting part 24 for selecting an arbitrary portion 49 set within a screen of the display part 3, a storage part 12 for storing a value (e.g., cursor position adjustment, level of brightness or rate of magnification) selected through the setting part 24, and a signal generator part 14 for generating a setting signal based on the value selected by the setting part 24.

The displaying apparatus includes a controller part 10 for storing the selected value input from the setting part 24 in the storage part 12 and generating a control signal corresponding to a set portion 49 (see FIG. 3) based on the selected value as stored. The displaying apparatus further includes a clock generator part 16 for generating a clock signal according to a reference point and a setting point of the set portion 49 based on the value selected by the setting part 24. The setting part 24 includes a portion setting part 18 for selecting whether or not to indicate (display) the set portion 49 within the screen of the display part 3, a size adjuster part 20 for adjusting the size of the set portion 49 or adjusting the magnification of an image within set portion 49, and a signal adjuster part 22 for adjusting values set for the respective colors of the set portion 49. Signal adjuster part 22 has several functions, such as enabling the adjustment of color values, the adjustment of brightness values and controlling the display of an OSD menu adjacent to set portion 49.

The displaying apparatus is further comprised of a signal composing and amplifying part 30 amplifying and composing control signals including a point signal, a size signal and a color signal generated by the controller part 10. The signal composing and amplifying part 30 is provided therein with a signal composer part 28 for composing a video signal input from the signal input part 1 with a setting signal generated by the signal generator part 14 and displaying the composed signal on the display part 3, and a pre-amplifier 26 amplifying the signal input from the signal input part 1.

The signal generator part 14 may be provided with R, G and B signal generator parts respectively corresponding to the R, G and B signals, and the signal composer part 28 may also be provided with R, G and B composer parts for composing R, G and B video signals respectively with R, G and B setting signals.

In the displaying apparatus is provided a selector 5 for selecting a basically set pre-amp rate of the video signal input from the signal input part 1 and a pre-amp rate of the set portion 49. The signal selected through the selector 5 is applied to the signal composing and amplifying part 30.

The displaying apparatus according to the present invention is further provided with a scaler 32 adjusting the width of the signal applied to the display part 3. The controller part 10 controls the scaler 32 as set by the size adjuster part 20, thereby adjusting magnification for enlargement of a picture displayed on the set portion 49.

Figure 2:
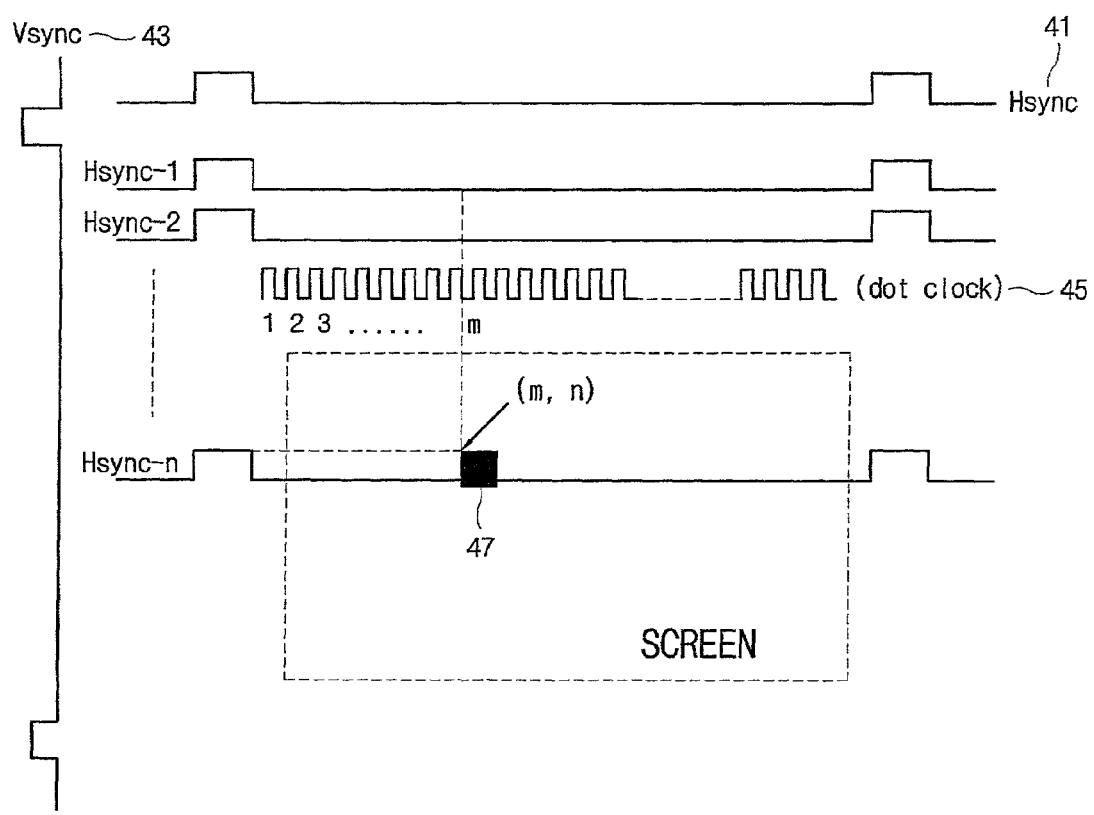
FIG. 2 is a view showing generation of a clock signal to set up a portion within a screen display according to the present invention.

As illustrated in FIG. 2 which is a view showing generation of a clock signal to set up a portion within a screen display according to the present invention, the clock generator part 16 generates a clock signal comprising a horizontal sync (Hsync) 41, a vertical sync (Vsync) 43 and a dot clock 45. After the horizontal sync 41, the vertical sync 43 and the dot clock 45 generated by the clock generator part 16 are applied to signal generator part 14, font graphic signals are generated by font generator part 14 so that an OSD cursor is indicated (displayed) at the x, y coordinates as desired. In the present embodiment, the font graphic signal is referred to as OSD cursor 47. Putting the Vsync 43 as a reference point, the OSD cursor 47 makes the nth Hsync 41 a value on a vertical-axis (n) coordinate, and putting the nth Hsync 41 as a reference point, the OSD cursor 47 makes the mth dot clock a value on a horizontal-axis (m) coordinate. Thus, if it is selected to indicate the set portion 49 through the portion setting part 18, the OSD cursor 47 of (m, n) is generated and displayed on the screen of display part 3.

Figure 3:
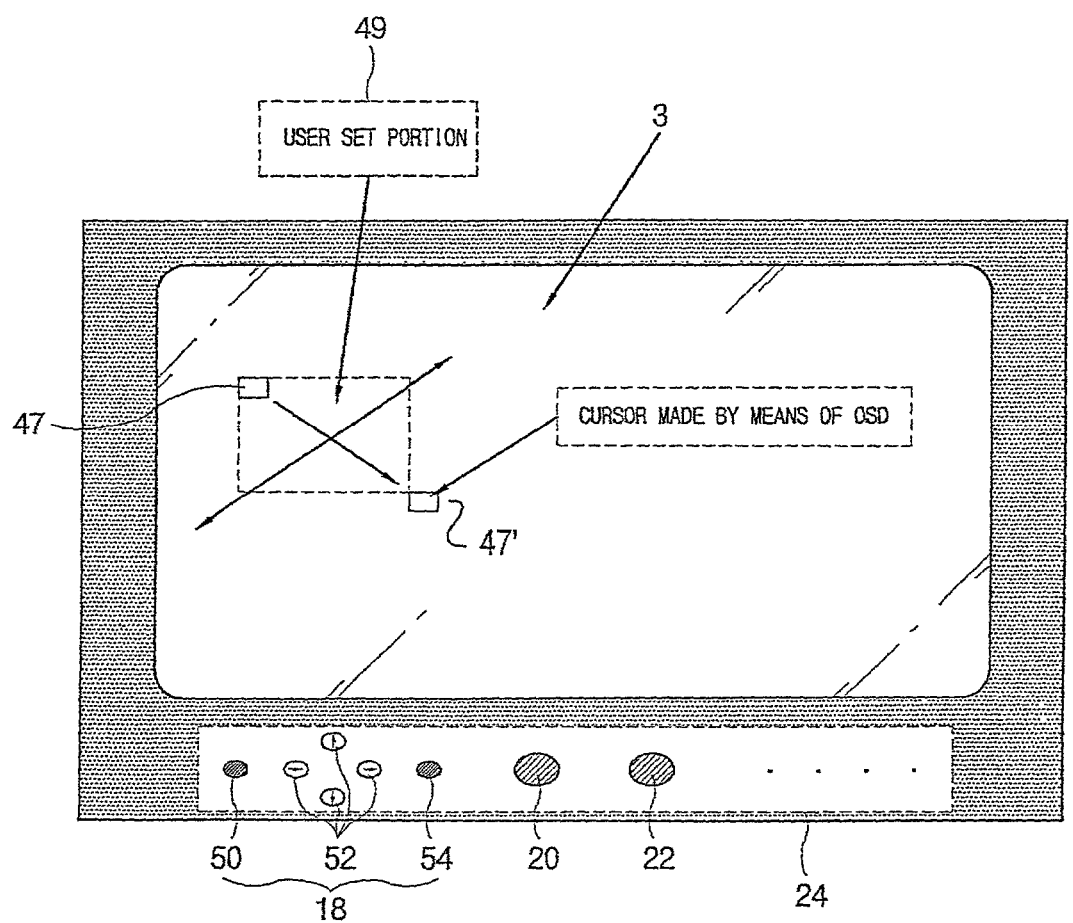
FIG. 3 is a front plane view of a display part on which the set portion is displayed, according to the present invention.

Referring to FIG. 3 which is a front plane view of display part 3 on which the set portion 49 is displayed, according to the present invention, the setting part 24 in the displaying apparatus may be formed with a plurality of keys.

The portion setting part 18 of the setting part 24 is comprised of a selection key 50 for selecting the set portion 49, adjuster keys 52 for changing the size and location of the set portion 49, and a cancellation key 54 for canceling the set portion 49. It should be understood that the initial position of OSD cursor 47 is chosen by toggling selection key 50, and the initial position of OSD cursor 47 can be moved arbitrarily using adjuster keys 52. Also, the size of set portion 49 can be adjusted using size adjuster part 20 and adjuster keys 52.

The user can indicate (display) a desired size of set portion 49 on an arbitrary position of the display part 3 by means of the plurality of keys of the portion set part 18. If the set portion 49 is indicated (displayed), a picture in the set area 49 can be enlarged or reduced in size by selecting the size adjuster part 20 and then manipulating adjuster keys 52. Also, if the set portion 49 is indicated, the colors of the picture in the set area 49 can be adjusted by selecting signal adjuster part 22 and then manipulating adjuster keys 52.

FIG. 4 illustrates a control flow chart of the displaying apparatus according to the present invention. Referring to this figure, when power is supplied to the displaying apparatus, video signals having a certain voltage received through the signal input part 1, that is, R, G and B signals, are applied (S1), and a picture is displayed on the display part 3 according to the input video signals (S3). The set portion 49 is selected through the setting part 24 by the user (S5), the controller part 10 stores a value, selected through the setting part 24, in the storage part 12 and generates an OSD cursor 47, for indicating the set portion 49, through the clock generator part 16 (S7).

After the OSD cursor 47 is generated, the user arbitrarily adjusts the size and location of the set portion 49 through the portion set part 18 (S9). In the step S9, when the user selects, initially, selection key 50 of portion set part 18, the OSD cursor 47, as a reference, is displayed. Then the position of OSD cursor 47 can be adjusted using adjuster keys 52. Then, when the size of set portion 49 is adjusted, using size adjuster part 20 and adjuster keys 52, another OSD cursor 47' is moved to a position, as shown in FIG. 3, diagonal to the initial OSD cursor 47. Thus the size of the set portion 49 is adjusted according to the diagonal spacing between OSD cursors 47. The crossed arrows in FIG. 3 illustrate this size adjustment.

After the set portion 49 is indicated, the user selects the signal adjuster part 22 to adjust the brightness of the set portion 49 (S11). If the signal adjuster part 22 is selected, the controller part 10 generates a highlight signal through the signal generator part 14, and the signal composing and amplifying part 30 composes the highlight signal with the video signal. For example, if 0.5V of a video signal is applied and 0.2V of a highlight signal is applied, the voltage of the set portion 49 becomes lighter as 0.7V. The brightness level can be adjusted using the left or right arrow keys of adjuster keys 52, or using the up or down arrow keys of adjuster keys 52.

After the set portion 49 is indicated, if the size adjuster part 20 is selected, magnification of the picture displayed on the set portion 49 is adjusted (S13). If the size adjuster part 20 is selected, the controller part 10 controls the scaler 32 to enlarge or reduce the picture within the set portion 49, and displays the enlarged or reduced picture on the display part 3. The magnification level can be adjusted using the left or right arrow keys of adjuster keys 52, or using the up or down arrow keys of adjuster keys 52.

The controller part 10 determines whether the cancellation function of the set portion 49 has been input through the cancellation key 54 of setting part 24 (S15), and suspends indication of the set portion 49 displayed on the display part 3 if the cancellation function is input (S17). If the indication of the set portion 49 is in suspension, the picture is displayed based on the video signals received by the signal input part 1 (S21). Otherwise, if the cancellation function is not input, the set portion 49 is continuously indicated on the display part 3 (S19).

The indication of the set portion 49 may be suspended even when the cancellation function is input in any of steps S7 through S13.

As described above, according to the present invention, a user is able to designate an arbitrarily set portion within a screen of the display part, and further, he/she can select a size, a location and a color of the set portion set by the user as desired, thereby being capable of highlight an arbitrary picture information as the user desires.

The user can also adjust values of R, G & B signals, respectively, using the OSD menu, signal adjuster part 22 and adjuster keys 52 thereby making it easy to adjust a color of the set portion and being capable of changing the brightness of viewed image pictures such as moving pictures or photos as desired by the user.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A displaying apparatus comprising a signal generator part generating a video signal, and a display part displaying thereon a picture based on the video signal generated by the signal generator part, further comprising:
   a setting part including a portion set part displaying a set portion at a user chosen arbitrary position of a screen of the display part, and a size adjuster part adjusting the size of the set portion based on movement of a cursor from the arbitrary position within the portion set by the portion set part to another position;
   a controller part for storing a position value of the set portion set by the setting part, generating a setting signal corresponding to the set portion based on the position value, and processing the video signal according to the setting signal;
   a storage part storing the position value of the set portion set through the setting part; and
   a scaler adjusting the width of the setting signal of the set portion set through the size adjuster part;
   the controller part increases or decreases a signal level of the set portion by offsetting a value of the video signal and a value of the setting signal.

2. The displaying apparatus according to claim 1, wherein the controller part increases a signal level of the set portion by synthesizing a value of the video signal and a value of the setting signal.

3. The displaying apparatus according to claim 1, wherein the controller adjusts the signal level of the set portion by composing the video signal with the setting signal.

4. A displaying apparatus comprising a signal generator part generating a video signal, and a display part displaying thereon a picture based on the video signal generated by the signal generator part, further comprising:
   a setting part including a portion set part displaying a set portion at a user chosen arbitrary position of a screen of the display part, and a size adjuster part adjusting the size of the set portion based on movement of a cursor from the arbitrary position within the portion set by the portion set part to another position;
   a controller part for storing a position value of the set portion set by the setting part, generating a setting signal corresponding to the set portion based on the position value, and processing the video signal according to the setting signal; and
   a clock generator part generating a clock according to a reference position of the set portion based on the position value of the set portion set by the portion set part.

5. The displaying apparatus according to claim 4, wherein the setting signal comprises at least one color signal corresponding to the video signal; and
   the setting part further comprises at least one signal adjuster part for changing the levels of the respective color signals.

6. A method of controlling a displaying apparatus comprising a signal generator part generating a video signal, and a display part displaying thereon a picture based on the video signal generated by the signal generator part, comprising the steps of:
   setting a set portion at an arbitrary position within a screen of the display part,
   adjusting a size of the set portion based on movement of a cursor from the arbitrary position of the set portion to another position;
   generating a setting signal corresponding to the set portion;
   processing the video signal according to the setting signal corresponding to the set portion; and
   displaying the video signal,
   with the setting signal including a magnification signal, and the video signal is processed corresponding to the magnification signal,
   in the step of processing the video signal, the video signal and the setting signal corresponding to the set portion are offset.

7. The method according to claim 6, wherein in the step of processing the video signal, the video signal and the setting signal corresponding to the set portion are synthesized.

8. The method according to claim 6, wherein in the step of setting the setting portion, a clock is generated according to a reference position of the set portion based on the position value of the set position.

9. The method according to claim 6, wherein the setting signal includes at least one color signal, and the video signal is processed corresponding to the color signal.

10. The method according to claim 6, wherein when the video signal is processed corresponding to the magnification signal, the width of the video signal is adjusted.

11. A displaying apparatus comprising a signal generator part generating a video signal, and a display part displaying thereon a picture based on the video signal generated by the signal generator part, further comprising:

a setting part enabling a user to adjust an image, said setting part comprising:

a portion set part for displaying a set portion on a screen of the display part, said portion set part including a selection key, a plurality of adjuster keys and a cancellation key, said selection key, when toggled by the user, causing an initial cursor to be displayed on the screen, a position of said initial cursor being arbitrarily adjusted by user manipulation of said adjuster keys, and said set portion being removed from the screen in response to user manipulation of said cancellation key;

a size adjuster part for enabling the user to adjust a size of said set portion, said size adjuster part, when toggled by the user, displaying a second cursor on said screen, said size of said set portion being adjusted by moving said second cursor diagonally with respect to said initial cursor by user manipulation of said adjuster keys; and a signal adjuster part enabling the adjustment of brightness values of an image displayed in the set portion, said brightness values being adjusted by user manipulation of said adjuster keys.

12. The displaying apparatus as set forth in claim 11, said size adjuster part further enabling the user to adjust a magnification of the image displayed in the set portion in response to user manipulation of said adjuster keys.

13. The displaying apparatus as set forth in claim 11, said signal adjuster part further enabling the adjustment of color values of the image displayed in the set portion in response to user manipulation of said adjuster keys.

14. The displaying apparatus as set forth in claim 13, said signal adjuster part further enabling the adjustment of color values of the image displayed in the set portion in response to user manipulation of said adjuster keys.

* * * * *